United States Patent [19]

Foxcroft

[11] Patent Number: 5,622,582
[45] Date of Patent: Apr. 22, 1997

[54] METHOD OF FORMING PRINTED COMPOSITE MATERIAL

[75] Inventor: Geoffrey Foxcroft, East Keilor, Australia

[73] Assignee: Viapak Pty Ltd, Australia

[21] Appl. No.: 446,610

[22] PCT Filed: Dec. 1, 1993

[86] PCT No.: PCT/AU93/00615

§ 371 Date: May 31, 1995

§ 102(e) Date: May 31, 1995

[87] PCT Pub. No.: WO94/12335

PCT Pub. Date: Jun. 9, 1994

[30] Foreign Application Priority Data

Dec. 1, 1992 [AU] Australia .................... PL6137

[51] Int. Cl.$^6$ ............... B32B 31/08; B32B 31/12; B32B 31/20
[52] U.S. Cl. ............... 156/199; 156/222; 156/224; 156/277; 156/285
[58] Field of Search ............... 156/222, 224, 156/199, 277, 285, 324; 206/459.5; 229/407; 220/453; 264/510, 132, 135; 493/53, 55, 56, 84, 85, 110, 320, 324, 338, 339, 343–346, 379–381, 906

[56] References Cited

U.S. PATENT DOCUMENTS 3,453,165  7/1969  Isbey et al. .
3,607,519  9/1971  Beyer et al. .................... 156/277 X
3,697,369  10/1972  Amberg et al. .

FOREIGN PATENT DOCUMENTS 776276  6/1957  United Kingdom .
1104793  2/1968  United Kingdom .

OTHER PUBLICATIONS

Derwent Abstract Accession No. 92809X/50, Classes A93, F08, P73, P78, Q45, DT, A, 2620731 (Forbo–Krommenie BV) 2 Dec. 1976, Abstract.

Derwent Abstract Accession No. 86620A/48, Classes A32, A14, A23, A94, JP, A, 53–121051 (Toppan Printing KK) 23 Oct. 1978, Abstract.

Patent Abstracts of Japan, M–839, p. 5, JP,A, 1–64825 (Denki Kagaku Kogyo K.K.) 10 Mar. 1989, abstract, figure.

Patent Abstracts of Japan, M–620, p. 113, JP;A, 62–70019 (Fukuyama Pearl Shiko K.K.) 31 Mar. 1987, abstract, figure.

Patent Abstracts of Japan, M–1072, p. 56, JP,A, 2–270530 (Mitsubishi Yuka Badische Co Ltd) 5 Nov. 1990, Abstract, figure.

*Primary Examiner*—Adrienne C. Johnstone
*Attorney, Agent, or Firm*—Fish & Richardson P.C.

[57] ABSTRACT

A method of producing a printed article includes the following steps: providing a first web of polyethylene upon which a pattern has been printed; providing a second web of plastics material from which the article is to be formed, one of the first or second webs having a heat seal lacquer applied thereto; passing the first and second webs through a pair of heated rollers to cause the heat seal lacquer to become tacky; directing the first and second webs in adjacent overlying relation to a vacuum forming machine including a mold and applying heat and vacuum in the vacuum forming machine to cause the first and second webs to conform to the shape of the mold to produce the printed article, wherein the application of heat in the vacuum forming machine activates the heat seal lacquer to adhere the first and second webs together.

4 Claims, 2 Drawing Sheets

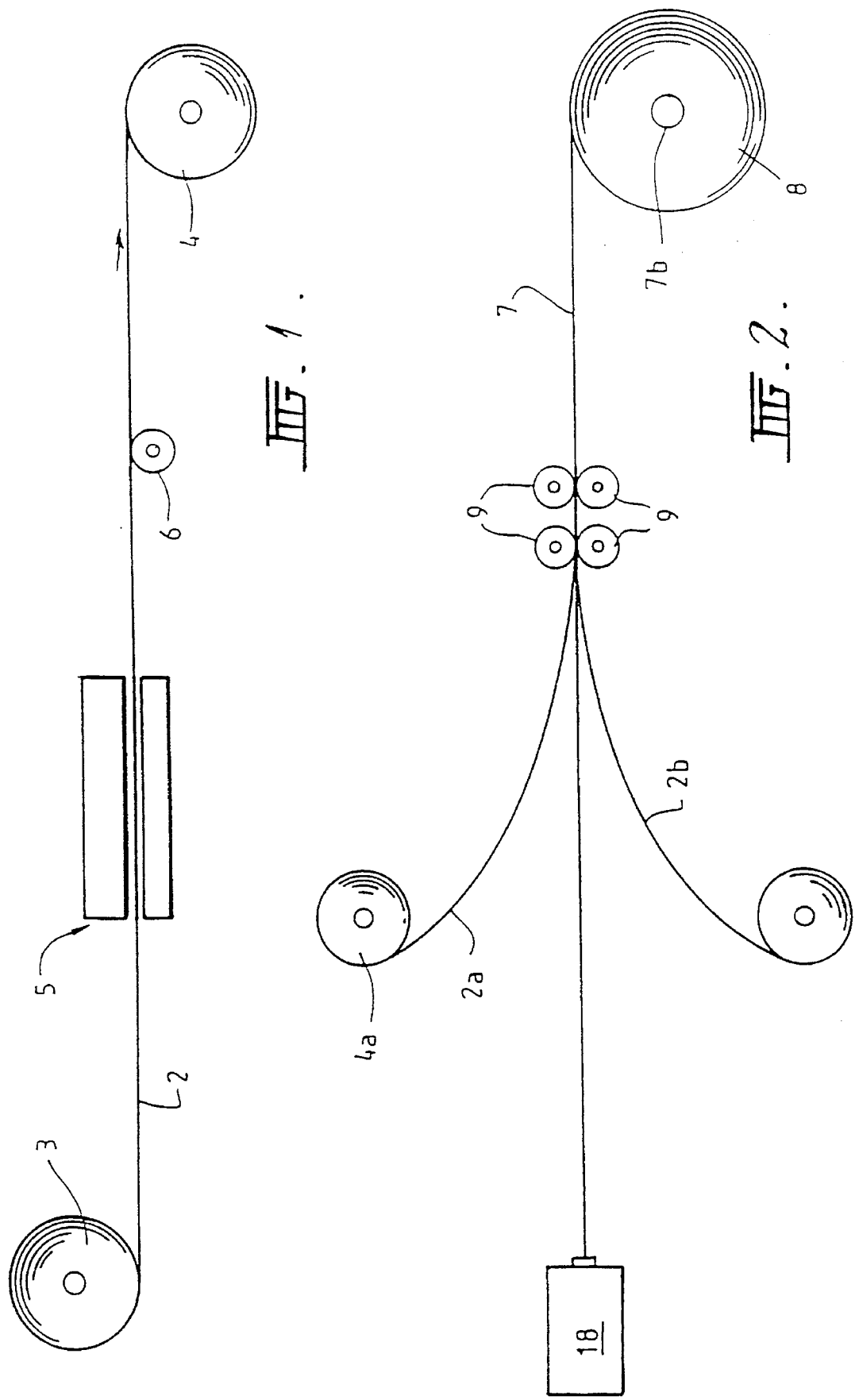

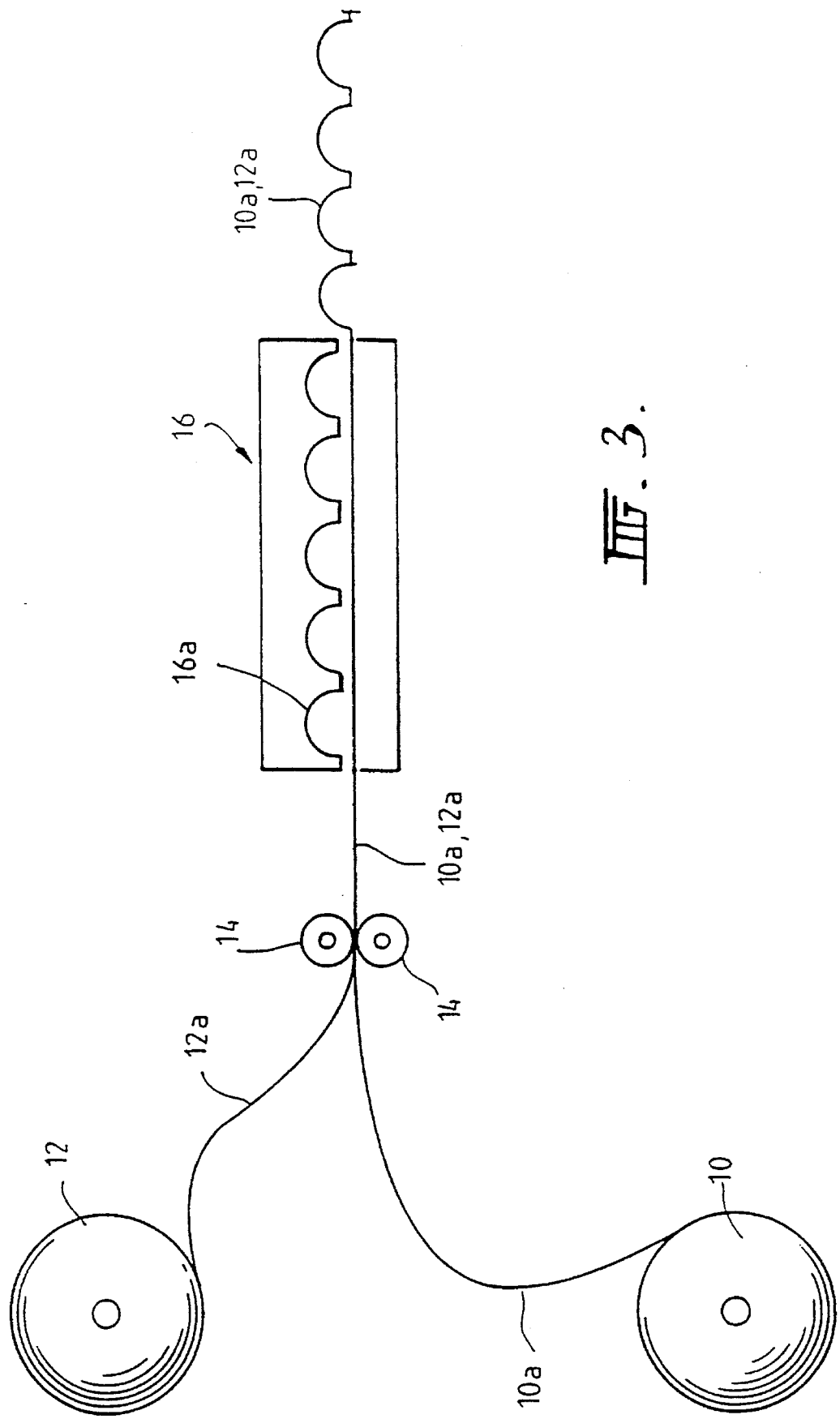

METHOD OF FORMING PRINTED COMPOSITE MATERIAL

BACKGROUND OF THE INVENTION

This invention relates to a method of forming a composite sheet material and of forming a printed article and to a composite sheet material and a printed article.

The printing of articles such as containers, trays or the like usually requires the article to be formed in a manufacturing operation and for the completed article to then be printed in a separate printing operation either by directly printing on the article or by applying a printed foil or sheet to the article. Other techniques include laminating a plastic sheet with a printed sheet and then in a subsequent operation forming the plastic sheet into an article.

These operations are time consuming and the additional handling and work required adds to the cost of the finished article.

Some attempts have been made to print directly on polyvinyl chloride (PVC) material or other material from which containers are molded, and the results have not been good.

SUMMARY OF THE INVENTION

The object of a first aspect of this invention is to provide a composite sheet material from which articles can be made and a method of forming the composite sheet material.

The invention, in the first aspect, provides a composite sheet material including:

a first web of printed plastics material upon which a pattern has been printed;

a second web of plastics material adhered to the first web of plastics material by bringing the first and second webs of plastics material together.

Preferably the first and second web are brought together following extrusion of the second web and while the second web is in a heated condition caused by extrusion so that the heated condition of the second web of plastics material causes the first web of printed plastics material to adhere to the second web of plastics material to thereby form said composite sheet material.

The invention may also be said to reside in a method of forming a composite sheet material including:

providing a first web of printed plastics material upon which a pattern has been printed;

providing a second web of plastics material; and bringing the first and second webs of plastics material together and adhering the webs together.

Preferably the second web of plastics material is in a heated condition caused by extrusion when brought together with the first web so that the heated condition of the second web of plastics material causes the first web of printed plastics material and the second web of plastics material to adhere together to form the composite sheet material.

Preferably the first and second webs pass between heated rollers to adhere the first and second webs together.

Preferably the first web has a heat activated adhesive applied to it to assist adhesion.

Preferably the method includes the step of coating the printed web with a heat seal lacquer prior to bringing the first and second webs adjacent to one another.

The object of a second aspect of this invention is to provide a method of printing an article which reduces costs and handling required in order to print the article.

The invention may be said to reside in a method of producing a printed article comprising:

providing a first web of printed plastics material upon which a pattern has been printed;

providing a second web of plastics material from which the article is to be formed;

bringing the first and second webs adjacent to one another so that the one of the webs overlies the other of the webs;

locating the webs in a mold in which heat is applied to the webs so that the webs are deformed to match the contour of the mold, to join the webs together and thereby form the printed article.

Since the two webs are brought adjacent to one another and are joined together during the manufacturing process the completed printed product is effectively formed during molding of the article and therefore handling costs and production costs for producing a printed article are reduced.

Preferably the method includes the steps of coating the printed web with a heat seal lacquer prior to locating the first and second webs in the mold.

Preferably the method also includes the steps of passing the first and second webs through a pair of heated rollers before locating the webs in the mold to cause the heat seal lacquer to become tacky to reduce the risk of wrinkling of the first web as the webs are moved into and through the mold.

Preferably the step of passing the webs through the heated rollers also assists in bringing the webs adjacent to one another with one web overlying the other.

In the preferred embodiment of the invention the molding operation which heats the webs activates the heat seal lacquer and causes the two webs to adhere to one another during the molding operation as the article is formed.

Preferably the first web comprises polyethylene and the second web comprises PVC material. Preferably the webs are provided in rolls.

The invention my also be said to reside in a printed article formed according to the above mentioned method.

BRIEF DESCRIPTION OF THE DRAWINGS

A preferred embodiment of the invention will be described, by way of example, with reference to the accompanying drawings in which:

FIG. 1 is a view showing the formation of a printed and coated plastics web according to one embodiment of the invention;

FIG. 2 shows the formation of a printed composite sheet material according to the preferred embodiment of the invention; and FIG. 3 shows the formation of a printed article according to the preferred embodiment of the invention.

DESCRIPTION OF THE PREFERRED EMBODIMENT

With reference to FIG. 1 a web of plastics material 2, such as polyethylene, is shown which travels from a storage roll 3 to a take up roll 4 and which is printed with a predetermined pattern by a standard printing press 5. A coating of a heat seal lacquer is applied to the web 2 by a coating roller 6 or any other suitable device. Thus a printed and coated web is wound onto the take up roll 4.

With reference to FIG. 2, a second web 7 is extruded from an extruder 18 and may comprise PVC, polyethylene terephthalene (PET), BAREX (an ionomer polymer), polycarbonate, acrylonitrile butadiene styrene (ABS), high impact polystyrene (H.I.P.S.) material etc. A printed and coated web 2a formed in the manner described with reference to FIG. 1 is provided from a roll 4a and is brought adjacent to the web 7 after it is extruded from the extruder 8 and while the web 7 is still in a heated condition caused by extrusion. The printed web 2a and the web 7 pass between heated tension rollers 9 which bring the webs 2a and 7 together so that the webs 2a and 7 are brought adjacent one another in an overlapping relationship as they move between the rollers 9. In view of the heated condition of the web 7 and the fact that the webs 2a and 7 are brought together between the rollers 9, the webs 2a and 7 adhere together to form a composite sheet material. The heat seal lacquer which is applied to the web 2a by the coating roller 6 shown in FIG. 2 is also activated by the heated condition of the web 7 to adhere the web 2a and the web 7 together to ensure that the webs 2a and 7 are joined. A composite sheet material 7a is therefore formed and drawn onto a roller 7b to form a roll of printed composite material 8.

If desired, a second web 2b of printed material which is identical to the web 2a can also be joined with the web 7 and on the opposite side of the web 7 by passing the second web 26 also between the rollers 9. The printed composite sheet material 8 can then be used in a manufacturing process to form an article such as by vacuum forming, or the like.

FIG. 3 shows an embodiment of the invention in which a printed article is formed.

In order to form the printed article a roll 10 of PVC material from which the article is to be formed is provided from which a web 10a is drawn.

A roll of printed polyethylene 12 is also provided which has been printed with a design or pattern which may be a mere color coating applied to the polyethylene, literary information, aesthetic design or advertising material etc. The polyethylene material may be printed at a printing station which is remote from the location at which the article is formed. Polyethylene webs are generally in the form of films and are therefore quite thin and printability is excellent. The polyethylene web can be printed in a standard printing press. After printing the polyethylene web the printed film is coated with a heat seal lacquer which is allowed to dry and the film is rolled into a roll 12.

A web 12a of the printed polyethylene is drawn from the roll 12 and the webs 10a and 12a are passed through a pair of oil heated rollers 14. Webs 10a and 12a are brought adjacent one another in an overlapping relationship as they move through the rollers 14.

Heated rollers 14 apply heat to the webs 12a and 10a and cause the heat seal lacquer applied to the printed polyethylene web 12a to become tacky and to cling to the PVC web 10a. This reduces the likelihood of wrinkling of the polyethylene web 12a during the molding step to follow and also holds the webs in the adjacent overlapping relationship with respect to one another.

The overlapped and adjacent webs 10a and 12a are then passed to a vacuum forming machine 16 where articles are to be molded by vacuum forming. Such vacuum forming machines are well known and therefore will not be described in detail other than to say that it includes molds 16a which have the shape of the article which is to be formed and that heat and vacuum is applied to the webs 10a and 12a so that the webs are drawn into the mold 16a to match the contour of the mold 16a to form the article. Usually, a plurality of articles will be molded in a single operation and the formed web 10a', 12a' moves out of the forming machine 16 to a cutting station where individual articles are cut from the formed web 10a', 12a'.

The webs 10a and 12a are bonded together in the forming operation in the forming machine 16 so that the formed article is effectively a single web of material which appears to be printed in view of the print applied to the polyethylene web 12a.

Preferably the web 12a is arranged so that the printed surface of the web 12a is brought into contact with the PVC web 10a so that the printed design is effectively encased within the article when the two webs are joined together in the forming machine 16. This also ensures that there will be no contact of the printed pattern with a product to be contained in the article. This is advantageous in the case where the article is intended to contain food products.

The invention also enables a reduction in the thickness of the PVC material which is used to mold the article because the gauge of the polyethylene web can be used to bring the gauge of the finished article up to a specified thickness. The ability to reduce the thickness of the PVC web therefore reduces costs.

Since modifications within the spirit and scope of the invention my readily be effected by persons skilled within the art, it is to be understood that this invention is not limited to the particular embodiment described by way of example hereinabove.

The claims defining the invention are as follows:

1. A method of producing a printed article including the following steps:

providing a first web of polyethylene upon which a pattern has been printed;

providing a second web of plastics material from which the article is to be formed, one of the first or second webs having a heat seal lacquer applied thereto;

passing the first and second webs through a pair of heated rollers to cause the heat seal lacquer to become tacky;

directing the first and second webs in adjacent overlying relation to a vacuum forming machine including a mold, applying heat and vacuum in the vacuum forming machine to cause the first and second webs to conform to the shape of the mold to produce the printed article; and wherein the application of heat in the vacuum forming machine activates the heat seal lacquer to adhere the first and second webs together.

2. The method of claim 1 including the step of coating the first web with the heat seal lacquer prior to directing the first and second webs to the vacuum forming machine.

3. The method of claim 1 wherein the step of passing the webs through the heated rollers also assists in bringing the webs adjacent one another with one web overlying the other.

4. The method of claim 1 wherein the second web comprises polyvinyl chloride material.

* * * * *